US012800045B2

(12) United States Patent
Kuang et al.

(10) Patent No.: US 12,800,045 B2
(45) Date of Patent: Nov. 17, 2026

(54) FLOW-ADJUSTING VALVE SPOOL WITH BUTTON

(71) Applicant: KAIPING YIZHAN VALVE CORE CO., LTD., Jiangmen (CN)

(72) Inventors: Wenjie Kuang, Jiangmen (CN); Jieci Ou, Jiangmen (CN); Xianbing Shi, Jiangmen (CN); Junfa Shen, Jiangmen (CN)

(73) Assignee: KAIPING YIZHAN VALVE CORE CO., LTD., Jiangmen (CN)

(*) Notice: Subject to any disclaimer, the term of this patent is extended or adjusted under 35 U.S.C. 154(b) by 225 days.

(21) Appl. No.: 18/840,266

(22) PCT Filed: Jan. 23, 2024

(86) PCT No.: PCT/CN2024/073671
§ 371 (c)(1),
(2) Date: Aug. 21, 2024

(87) PCT Pub. No.: WO2025/020483
PCT Pub. Date: Jan. 30, 2025

(65) Prior Publication Data

US 2026/0243362 A1 Aug. 20, 2026

(30) Foreign Application Priority Data

Jul. 21, 2023 (CN) ......................... 202321925962.9

(51) Int. Cl.
*F16K 17/06* (2006.01)
*F16K 31/128* (2006.01)

(52) U.S. Cl.
CPC ............ *F16K 17/06* (2013.01); *F16K 31/128* (2013.01)

(58) Field of Classification Search
CPC ....... F16K 17/06; F16K 31/126; F16K 31/128
(Continued)

(56) References Cited

U.S. PATENT DOCUMENTS 3,376,013 A * 4/1968 Lawrence ............... F16K 21/04 251/38
5,169,117 A * 12/1992 Huang .................. F16K 31/086 251/38
(Continued)

FOREIGN PATENT DOCUMENTS

CN 112081956 A 12/2020
CN 115654145 A 1/2023
(Continued)

OTHER PUBLICATIONS

International Search Report and Written Opinion (ISRWO) corresponding to counterpart International Patent Application PCT/CN2024/073671 mailed Apr. 4, 2024, with English translation.

*Primary Examiner* — Kevin F Murphy
(74) *Attorney, Agent, or Firm* — Renner, Otto, Boisselle & Sklar LLP

(57) ABSTRACT

A flow-adjusting valve spool with button is disclosed, including a valve spool body, a blocking member, an on/off control member, and a flow control member. The blocking member is movably arranged in a sealing cavity, and blocks/opens a water inlet of a water outlet channel. The blocking member is provided with a water hole and a pressure relief hole. The on/off control member includes a long rod and an on/off control mechanism. The on/off control mechanism is installed in an installation cavity and connected to control the long rod. The blocking section of the long rod is maintained in a state of blocking or opening the pressure relief hole. The flow control member is movably installed on the valve spool body, and the installation position of the on/off control member in the installation cavity is adjusted through an installation position adjustment structure.

11 Claims, 7 Drawing Sheets

A—A

(58) Field of Classification Search
USPC ............................................................ 251/33
See application file for complete search history.

(56) References Cited

U.S. PATENT DOCUMENTS

| | | | | | |
|---|---|---|---|---|---|
| 5,758,863 | A * | 6/1998 | Buffet | F16K 31/3855 251/28 |
| 7,082,959 | B1 * | 8/2006 | Franklin | F16K 17/383 251/74 |
| 7,201,359 | B2 * | 4/2007 | Hwang | E03D 3/02 251/33 |
| 10,704,701 | B1 * | 7/2020 | Yu | F16K 27/0209 |
| 11,353,126 | B1 * | 6/2022 | Peng | F16K 31/0672 |
| 2004/0061083 | A1 * | 4/2004 | Cheng | F16K 31/128 251/30.01 |
| 2017/0315565 | A1 | 11/2017 | Medina | |

FOREIGN PATENT DOCUMENTS

| | | | |
|---|---|---|---|
| CN | 220249049 | U | 12/2023 |
| EP | 3945230 | A1 | 2/2022 |

* cited by examiner

FLOW-ADJUSTING VALVE SPOOL WITH BUTTON

CROSS-REFERENCE TO RELATED APPLICATIONS

This application is a national stage filing under 35 U.S.C. § 371 of international application number PCT/CN2024/073671, filed Jan. 23, 2024, which claims priority to Chinese patent application No. 202321925962.9 filed Jul. 21, 2023. The contents of these applications are incorporated herein by reference in their entirety.

TECHNICAL FIELD

The present disclosure relates to the technical field of sanitary products, and in particular, to a flow-adjusting valve spool with button.

BACKGROUND

The valve spool, as an important component in the field of sanitary products, can control the on and off of water. With the advancement of technology, the current valve spool can be more diversified, such as having both the water on and off function and the flow adjustment function. However, the structure of this type of valve spool is generally complex, and its flow adjustment function is often realized by rotating ceramic sheets to block the water hole to varying degrees. The valve spool of this above structure requires high part accuracy and installation accuracy, otherwise it is easy to have water leakage problems. The production of this above structure is more difficult, resulting in a lower qualification rate of the product than that of ordinary valve spools, a high price of the product, and difficulty in promotion and use.

SUMMARY

In order to solve the above technical problems, a multi-functional valve spool structure with a simple structure and low precision requirements is disclosed.

A flow-adjusting valve spool with button includes a valve spool body, a blocking member, an on/off control member, and a flow control member.

The valve spool body is provided with a water inlet channel, a water outlet channel, a sealing cavity and an installation cavity. The water inlet channel and the water outlet channel are coaxial, and a water outlet of the water inlet channel and a water inlet of the water outlet channel both face and are communicated with one end of the sealing cavity. The installation cavity is located at the other end of the sealing cavity and is divided.

The blocking member is movably arranged in the sealing cavity, and blocks/opens the water inlet of the water outlet channel to realize the non-communication or communication between the water inlet channel and the water outlet channel. The blocking member is provided with a water hole communicating with the water inlet channel and the sealing cavity, and provided with a pressure relief hole communicating with the water outlet channel and the sealing cavity. The water in the water inlet channel can pass through the water hole and enter the sealing cavity, so that the blocking effect of the blocking member on the water outlet channel is further improved through the hydraulic method. The water in the sealing cavity can also be discharged into the water outlet channel through the pressure relief hole. When switching to turn on the water, the water pressure in the sealing cavity can be released through the pressure relief hole, and the water in the water inlet channel can push open the blocking member, thereby realizing the communication between the water inlet channel and the water outlet channel.

The on/off control member includes a long rod and an on/off control mechanism, and an end of the long rod is a blocking section, where the blocking section passes through the installation cavity and the sealing cavity in sequence and points to the pressure relief hole. The on/off control mechanism is installed in the installation cavity and connected to control the long rod, and the blocking section of the long rod is maintained in a state of blocking or opening the pressure relief hole, that is, the on/off state of the valve spool can be switched through the on/off control member.

The flow control member is movably installed on the valve spool body, an installation position adjustment structure is provided between the flow control member and the on/off control member, and the flow control member adjusts the installation position of the on/off control member in the installation cavity through the installation position adjustment structure, and adjusts the degree of opening of the pressure relief hole by the long rod when the pressure relief hole is opened, thereby controlling the flow rate of the valve spool.

The long rod provided herein not only has the function of turning water on and off, but also can adjust the degree of opening of the pressure relief hole under the action of the flow control member, thereby realizing the function of the valve spool to turn water on and off and adjust the flow rate. The control structure for the long rod provided herein has the advantages of simple structure, low requirements on parts accuracy and low assembly accuracy, and can reduce valve spool leakage.

Preferably, the blocking member is a leather cup elastically installed in the sealing cavity.

Preferably, a pre-tightened pressing spring is provided between the blocking member and the sealing cavity, and the pressing spring pushes the blocking member towards the water inlet of the water outlet channel to provide a reset force for the blocking member.

Preferably, a diameter of the blocking section of the long rod is equal to a diameter of the pressure relief hole, and the on/off control mechanism controls the blocking section of the long rod to enter or exit the pressure relief hole. The flow control component adjusts the distance between an end of the blocking section of the long rod and the pressure relief hole through the installation position adjustment structure, so that the degree of opening of the pressure relief hole can be adjusted.

Preferably, the end of the blocking section of the long rod is provided with an annular cone surface. The pressure relief hole is provided with a sealing ring facing the annular cone surface.

Preferably, in order to improve the installation stability of the long rod and prevent the long rod from being staggered with the pressure relief hole when moving towards the pressure relief hole, the end of the blocking section of the long rod is provided with an extension rod that extends through the pressure relief hole, and a diameter of the extension rod is less than the diameter of the pressure relief hole.

Preferably, the on/off control mechanism adopts a ball-point pen switching mode and includes a pressing rod, a locking member, and a spring. The pressing rod is provided with an upper tooth column, the locking member is provided with a lower tooth column, and an inner wall of the installation cavity is provided with a guide groove. The pressing rod is movably installed in the installation cavity and extends out to form a pressing head. The pressing rod drives the long rod through the locking member to switch states.

Preferably, the flow control member is a sleeve sleeved and rotatably installed on the valve spool body and is coaxial with the pressing rod. The installation position adjustment structure is arranged between the sleeve and the pressing rod. By rotating, the installation position adjustment structure can adjust the installation position of the on/off control member.

Preferably, the installation position adjustment structure includes an annular inclined surface provided on an inner wall of the sleeve and a pushing block provided on the periphery of the pressing rod. The sleeve is rotated and the annular inclined surface drives the pressing rod to move in an axial direction by pressing down or releasing the pushing block, and the end of the blocking section of the long rod is close to or away from the pressure relief hole.

Preferably, a water inlet of the water inlet channel is located on the periphery of the valve spool body and provided with a filter screen. The water outlet of the water outlet channel is located at the bottom end of the valve spool body.

From the above description of the present disclosure, it can be seen that the present disclosure has the following beneficial effects:

1. The long rod provided herein not only has the function of turning water on and off, but also can adjust the degree of opening of the pressure relief hole under the action of the flow control member, so that the valve spool can have the functions of turning water on and off and adjusting flow, and the mechanism is simplified.
2. The long rod control structure provided herein has the advantages of simple structure, low requirements on parts accuracy and low assembly accuracy, and can reduce valve spool leakage.
3. The water hole is provided on the blocking member to improve the sealing degree of the valve spool in the water-off state by using water pressure.
4. The flow control member adopts a sleeve, and the installation position adjustment structure adopts an annular inclined surface and a pushing block. The structure is simple and has a good effect.

BRIEF DESCRIPTION OF DRAWINGS

The accompanying drawings described herein are used to provide a further understanding of the present disclosure and constitute a part of the present disclosure. The illustrative embodiments of the present disclosure and their descriptions are used to explain the present disclosure and do not constitute an improper limitation of the present disclosure.

Where.

Figure 1:
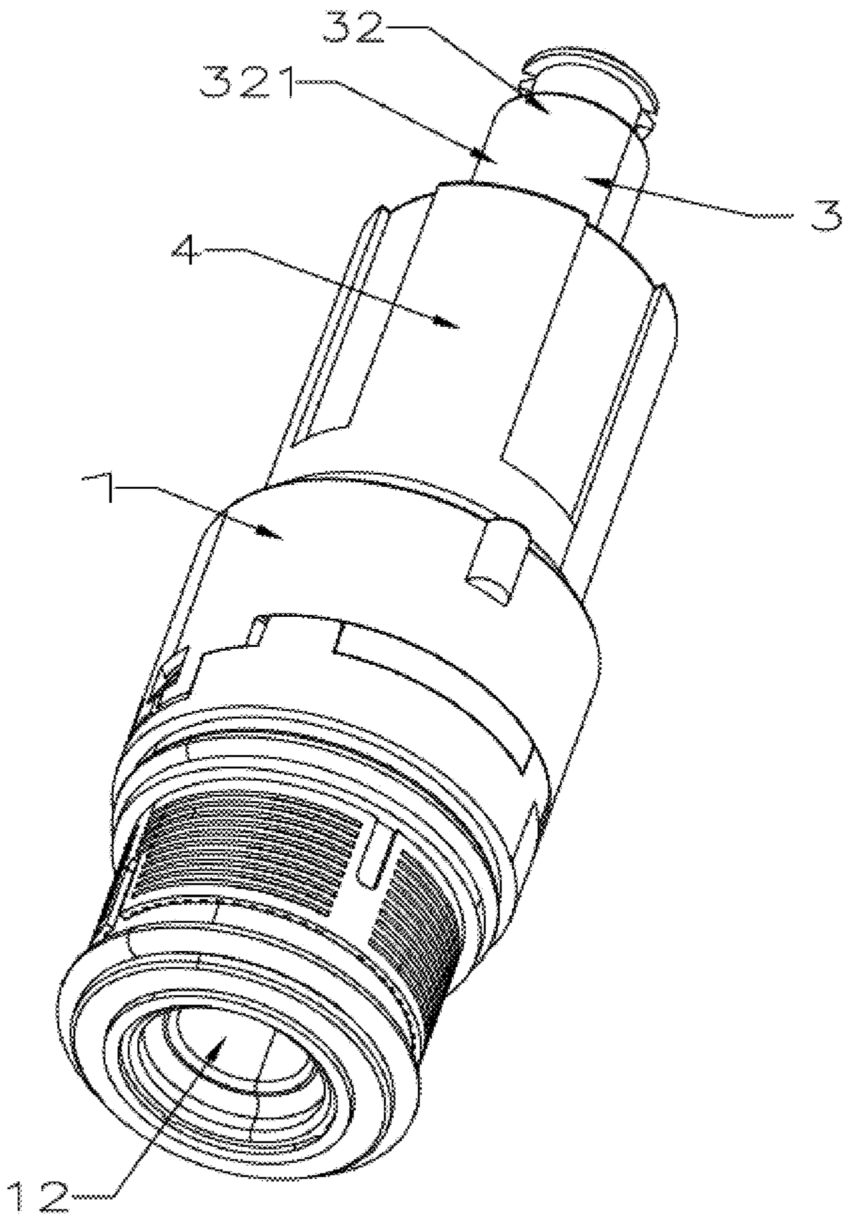
FIG. 1 is a first axial side view of a flow-adjusting valve spool with button.
Figure 2:
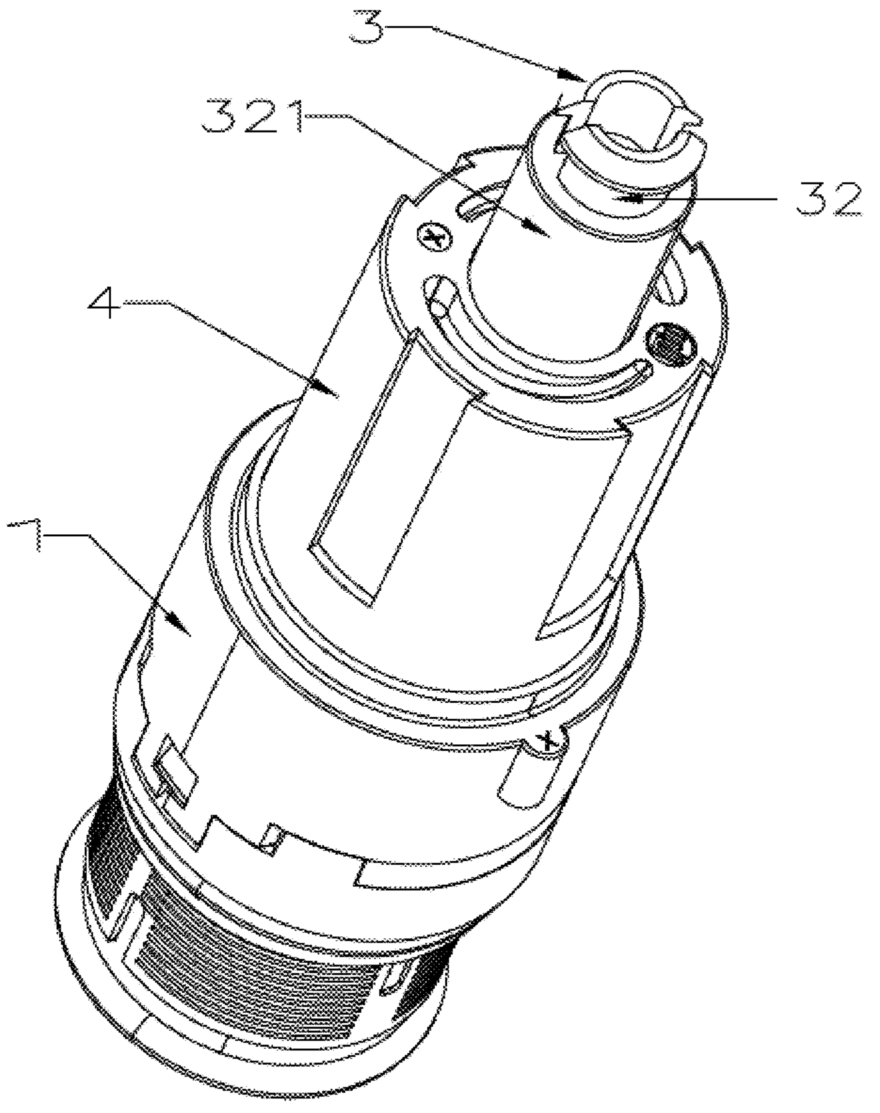
FIG. 2 is a second axial side view of a flow-adjusting valve spool with button.
Figure 3:
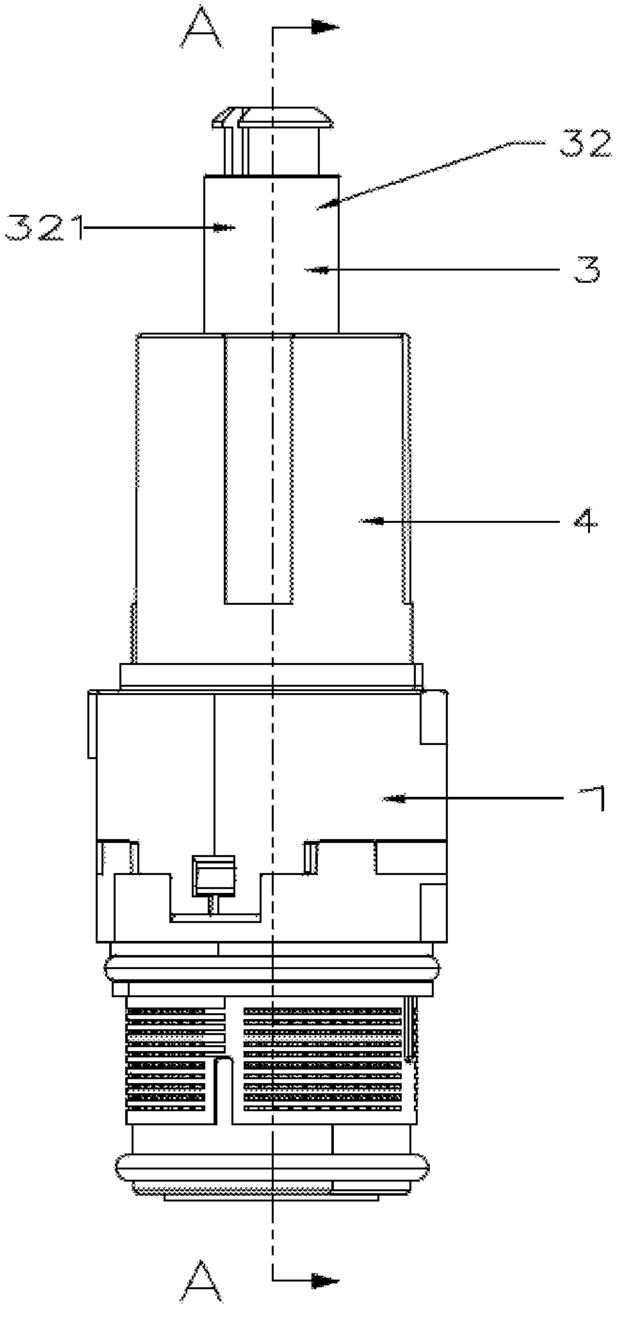
FIG. 3 is a front view of a flow-adjusting valve spool with button.
Figure 4:
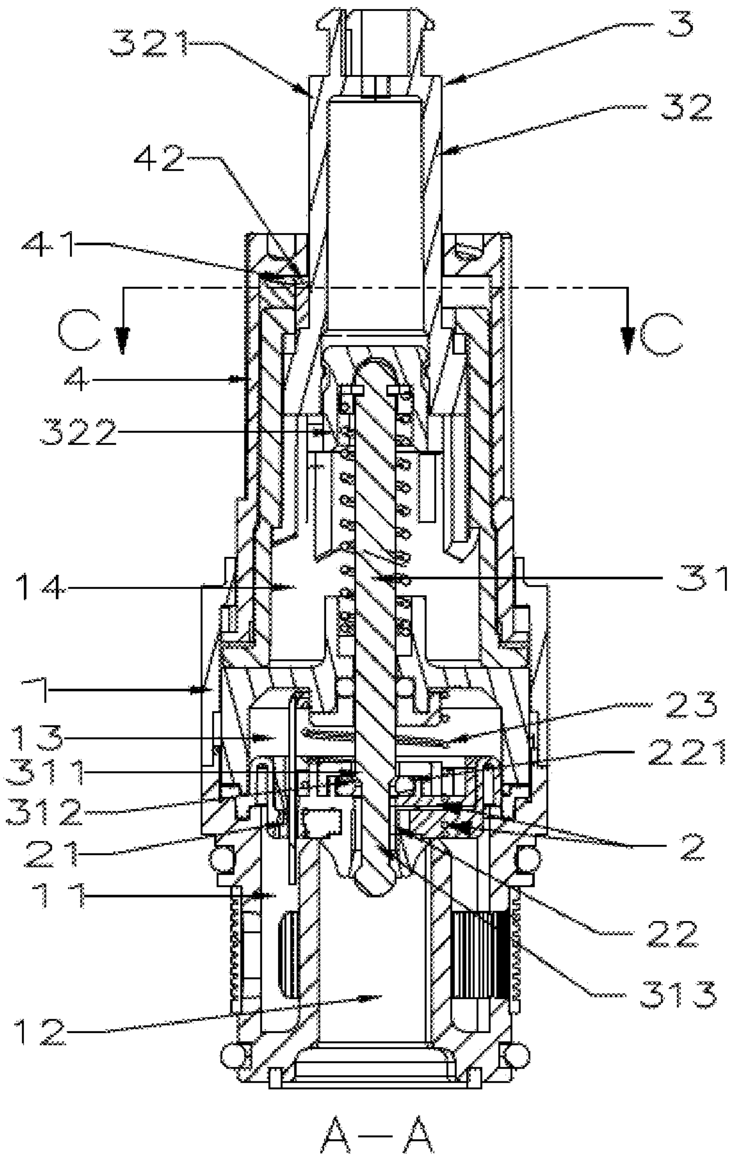
FIG. 4 is a first cross-sectional view of a flow-adjusting valve spool with button.
Figure 5:
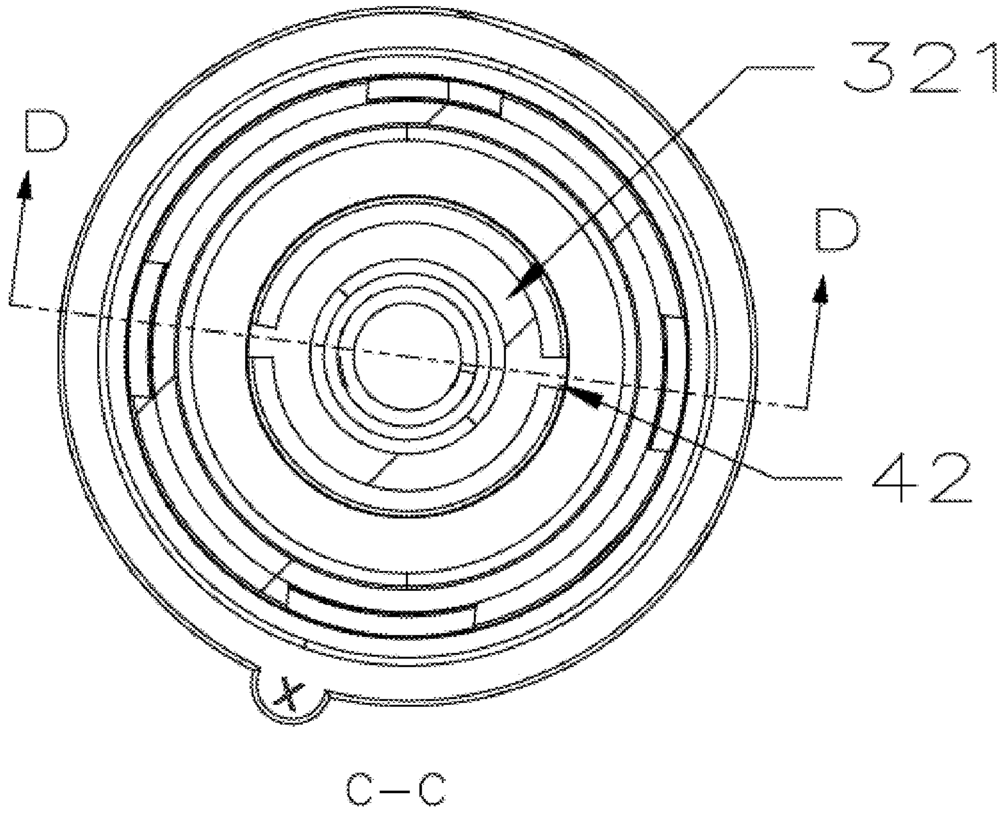
FIG. 5 is a second cross-sectional view of a flow-adjusting valve spool with button.
Figure 6:
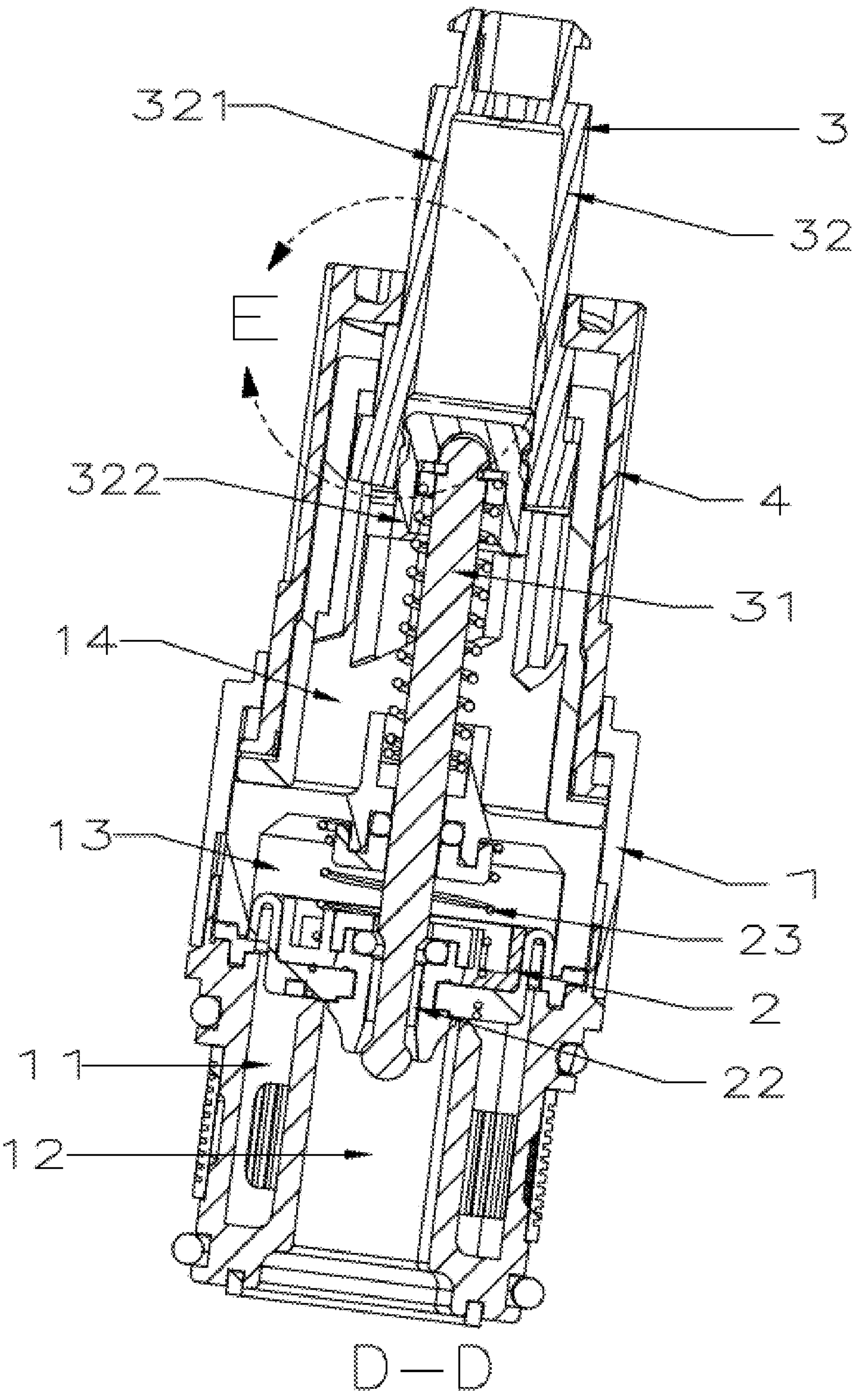
FIG. 6 is a third cross-sectional view of a flow-adjusting valve spool with button.
Figure 7:
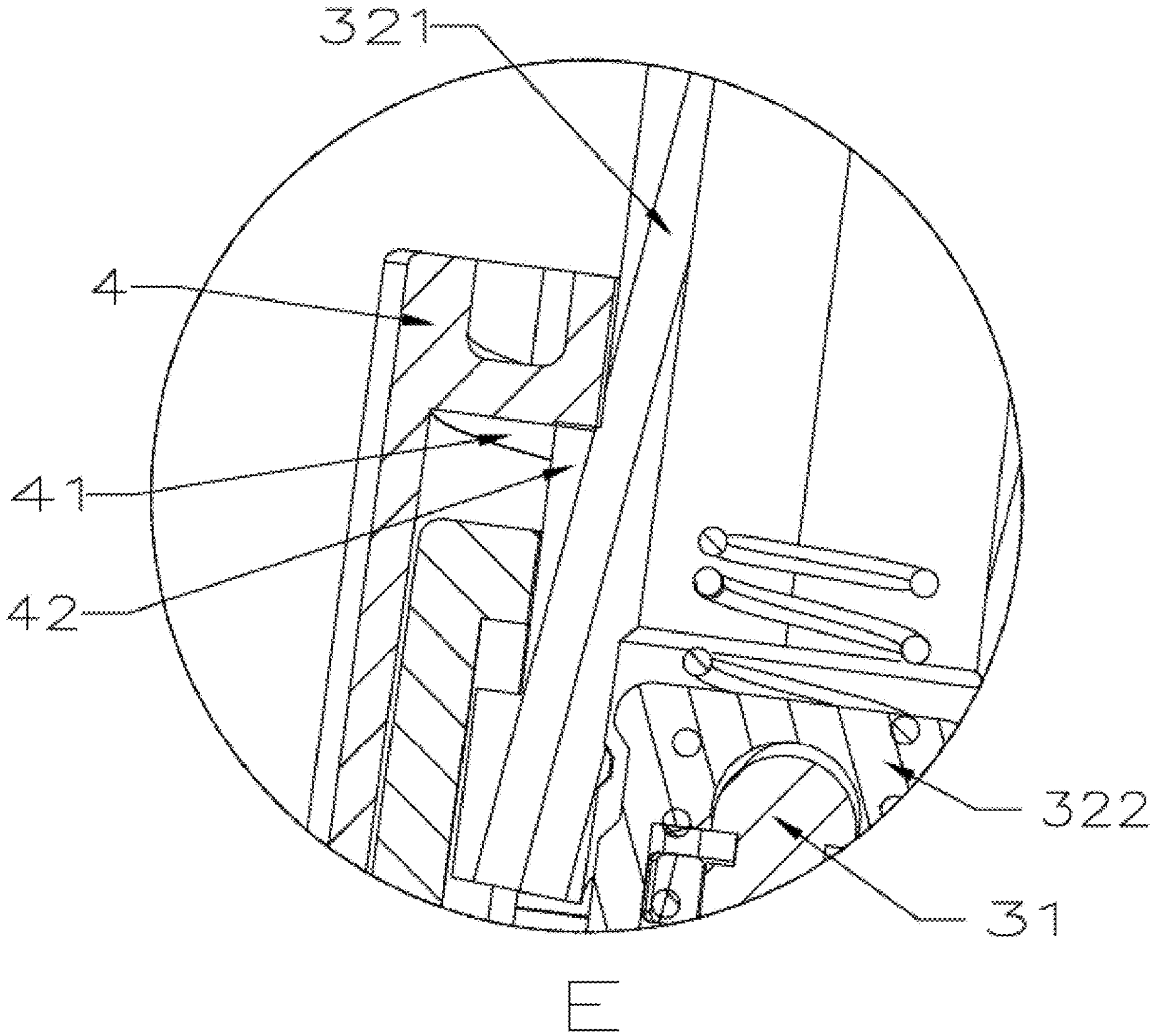
FIG. 7 is a partial enlarged view of a flow-adjusting valve spool with button.

The reference numerals in FIGS. 1 to 7 respectively refer to: valve spool body 1, water inlet channel 11, water outlet channel 12, sealing cavity 13, installation cavity 14, blocking member 2, water hole 21, pressure relief hole 22, sealing ring 221, pressing spring 23, on/off control member 3, long rod 31, blocking section 311, annular cone surface 312, extension rod 313, on/off control mechanism 32, pressing rod 321, locking member 322, flow control member 4, annular inclined surface 41, and pushing block 42.

DETAILED DESCRIPTION

In order to make the technical problems to be solved by, and technical solutions and beneficial effects of the present disclosure clearer and more understandable, the present disclosure will be further described in detail below with reference to the accompanying drawings and embodiments. It should be understood that the specific embodiments described here are merely used to explain the present disclosure rather than limiting the present disclosure.

Referring to FIGS. 1 to 7, a flow-adjusting valve spool with button includes a valve spool body 1, a blocking member 2, an on/off control member 3, and a flow control member 4.

The valve spool body 1 is provided with a water inlet channel 11, a water outlet channel 12, a sealing cavity 13, and an installation cavity 14. The water inlet channel 11 and the water outlet channel 12 are coaxial, and a water outlet of the water inlet channel 11 and a water inlet of the water outlet channel 12 both face and are communicated with one end of the sealing cavity 13. The installation cavity 14 is located at the other end of the sealing cavity 13 and is divided.

In one embodiment, a water inlet of the water inlet channel 11 is located on the periphery of the valve spool body 1 and provided with a filter screen. The water outlet of the water outlet channel 12 is located at the bottom end of the valve spool body 1.

The blocking member 2 is movably arranged in the sealing cavity 13, and blocks/opens the water inlet of the water outlet channel 12 to realize the non-communication or communication between the water inlet channel 11 and the water outlet channel 12. In this embodiment, the blocking member 2 is a leather cup elastically installed in the sealing cavity 13.

In addition, the blocking member 2 is provided with a water hole 21 communicating with the water inlet channel 11 and the sealing cavity 13, and provided with a pressure relief hole 22 communicating with the water outlet channel 12 and the sealing cavity 13. The water in the water inlet channel 11 can pass through the water hole 21 and enter the sealing cavity 13, so that the blocking effect of the blocking member 2 on the water outlet channel 12 is further improved through the hydraulic method. In another embodiment, a pre-tightened pressing spring 23 is provided between the blocking member 2 and the sealing cavity 13, and the pressing spring 23 pushes the blocking member 2 towards the water inlet of the water outlet channel 12 to provide a reset force for the blocking member. The water in the sealing cavity 13 can also be discharged into the water outlet channel 12 through the pressure relief hole 22. When switching to turn on the water, the water pressure in the sealing cavity 13 can be released through the pressure relief hole 12, and the water in the water inlet channel 11 can push and open the blocking member 2, thereby realizing the communication between the water inlet channel 11 and the water outlet channel 12.

The on/off control member 3 includes a long rod 31 and an on/off control mechanism 32, and one end of the long rod 31 is a blocking section 311, which passes through the installation cavity 14 and the sealing cavity 13 in sequence and points to the pressure relief hole 22. The on/off control mechanism 32 is installed in the installation cavity 14 and connected to control the long rod 31, and the blocking section 311 of the long rod 31 is maintained in a state of blocking or opening the pressure relief hole 22. In this embodiment, the diameter of the blocking section 311 of the long rod 31 is equal to the diameter of the pressure relief hole 22, and the on/off control mechanism 32 controls the blocking section 311 of the long rod 31 to enter or exit the pressure relief hole 22, that is, the on/off state of the valve spool can be switched through the on/off control member 3. In other embodiments, the end of the blocking section 311 of the long rod 31 is provided with an annular cone surface 312. The pressure relief hole 22 is provided with a sealing ring 221 facing the annular cone surface 312, which can improve the sealing degree.

In one embodiment, in order to improve the installation stability of the long rod 31 and prevent the long rod 31 from being staggered with the pressure relief hole 22 when moving towards the pressure relief hole 22, the end of the blocking section 311 of the long rod 31 is provided with an extension rod 313 that extends through the pressure relief hole 22, and the diameter of the extension rod 313 is less than that of the pressure relief hole 22.

In another embodiment, the on/off control mechanism 32 adopts a ballpoint pen switching mode and includes a pressing rod 321, a locking member 322, and a spring. The pressing rod 321 is provided with an upper tooth column, the locking member 322 is provided with a lower tooth column, and an inner wall of the installation cavity 14 is provided with a guide groove. The pressing rod 321 is movably installed in the installation cavity 14 and extends out to form a pressing head. The pressing rod 321 drives the long rod 31 through the locking member 322 to switch states. Since the ballpoint pen switching method belongs to the existing structure, it will not be described again here.

The flow control member 4 is movably installed on the valve spool body 1, an installation position adjustment structure is provided between the flow control member 4 and the on/off control member 3. The flow control member 4 adjusts the installation position of the on/off control member 3 in the installation cavity 14 through the installation position adjustment structure, and adjusts the degree of opening of the pressure relief hole 22 by the long rod 31 when the pressure relief hole 22 is opened, thereby controlling the flow rate of the valve spool.

In an embodiment, the flow control member 4 is a sleeve, which is sleeved and rotatably installed on the valve spool body 1 and is coaxial with the pressing rod 321. The installation position adjustment structure is arranged between the sleeve and the pressing rod 321. By rotating, the installation position adjustment structure can adjust the installation position of the on/off control member 3. In addition, the installation position adjustment structure includes an annular inclined surface 41 provided on an inner wall of the sleeve and a pushing block 42 provided on the periphery of the pressing rod 321. The sleeve is rotated and the annular inclined surface 41 drives the pressing rod 321 to move in an axial direction by pressing down or releasing the pushing block 42. The end of the blocking section 311 of the long rod 31 is close to or away from the pressure relief hole 22, so that the degree of opening of the pressure relief hole 22 can be adjusted.

The long rod 31 provided herein not only has the function of turning water on and off, but also can adjust the degree of opening of the pressure relief hole 22 under the action of the flow control member 4, thereby realizing the function of the valve spool to turn water on and off and adjust the flow rate. The control structure or the long rod 31 provided herein has the advantages of simple structure, low requirements on parts accuracy and low assembly accuracy, and can reduce valve spool leakage.

When in use, the initial state is a water-off state. At this time, the blocking member 2 blocks the water outlet of the water inlet channel 11 and the water inlet of the water outlet channel 12, the long rod 31 blocks the pressure relief hole 22, and the water in the water inlet channel 11 enters the sealing cavity 13 through the water hole 21, thereby improving the blocking effect of the blocking member 2 with the help of water pressure. The user operates the on/off control member 3 to control the long rod 31 to open the pressure relief hole 22, so as to relieve the water pressure in the sealing cavity 13. The blocking member 2 opens the water outlet of the water inlet channel 11 and the water inlet of the water outlet channel 12 under the action of the water pressure in the water inlet channel 11, so that the water outlet of the water inlet channel 11 and the water inlet of the water outlet channel 12 are communicated with each other, and the valve spool discharges water. The user adjusts the installation position of the on/off control member 3 by rotating the flow control member 4, thereby adjusting the distance between the end of the long rod 31 and the pressure relief hole 22, and controls the force at both ends of the blocking member 2 by controlling the drainage speed of the pressure relief hole 22, thereby controlling the distance between the blocking member 2 and the water outlet of the water inlet channel 11, so that the amount of water inlet can be controlled.

The present disclosure has been exemplarily described above in conjunction with the accompanying drawings. Obviously, the specific implementation of the present disclosure is not limited by the above manner. The various non-substantive improvements adopted using the method concepts and technical solutions of the present disclosure, or the direct application of the concept and technical program of the present disclosure to other occasions without improvement are within the scope of protection of the present disclosure.

The invention claimed is:

1. A flow-adjusting valve spool with a button, comprising a valve spool body, a blocking member, an on/off control member, and a flow control member, wherein the valve spool body is provided with a water inlet channel, a water outlet channel, a sealing cavity and an installation cavity; the water inlet channel and the water outlet channel are coaxial, and a water outlet of the water inlet channel and a water inlet of the water outlet channel both face and are communicated with one end of the sealing cavity; the installation cavity is located at another end of the sealing cavity and is divided;

the blocking member is movably arranged in the sealing cavity, and blocks/opens the water inlet of the water outlet channel; the blocking member is provided with a water hole communicating with the water inlet channel and the sealing cavity, and provided with a pressure relief hole communicating with the water outlet channel and the sealing cavity;

the on/off control member includes a long rod and an on/off control mechanism, and an end of the long rod is a blocking section, wherein the blocking section passes through the installation cavity and the sealing cavity in sequence and points to the pressure relief hole; the on/off control mechanism is installed in the installation cavity and connected to the long rod for controlling, and the blocking section of the long rod is maintained in a state of blocking or opening the pressure relief hole;

the flow control member is movably installed on the valve spool body, wherein an installation position adjustment structure is provided between the flow control member and the on/off control member, and the flow control member adjusts the installation position of the on/off control member in the installation cavity through the installation position adjustment structure, and adjusts the degree of opening of the pressure relief hole by the long rod when the pressure relief hole is opened.

2. The flow-adjusting valve spool with a button according to claim 1, wherein the blocking member is a leather cup elastically installed in the sealing cavity.

3. The flow-adjusting valve spool with a button according to claim 1, wherein a pre-tightened pressing spring is provided between the blocking member and the sealing cavity, and the pressing spring pushes the blocking member towards the water inlet of the water outlet channel.

4. The flow-adjusting valve spool with a button according to claim 1, wherein a diameter of the blocking section of the long rod is greater than or equal to a diameter of the pressure relief hole, and the on/off control mechanism controls the blocking section of the long rod to enter or exit the pressure relief hole; and wherein the flow control member adjusts the distance between an end of the blocking section of the long rod and the pressure relief hole through the installation position adjustment structure.

5. The flow-adjusting valve spool with a button according to claim 4, wherein the blocking section of the end of the long rod is provided with an annular cone surface; and wherein the pressure relief hole is provided with a sealing ring facing the annular cone surface.

6. The flow-adjusting valve spool with a button according to claim 5, wherein the blocking section of the end of the long rod is provided with an extension rod that extends through the pressure relief hole, and a diameter of the extension rod is less than the diameter of the pressure relief hole.

7. The flow-adjusting valve spool with a button according to claim 4, wherein the blocking section of the end of the long rod is provided with an extension rod that extends through the pressure relief hole, and a diameter of the extension rod is less than the diameter of the pressure relief hole.

8. The flow-adjusting valve spool with a button according to claim 1, wherein the on/off control mechanism adopts a ballpoint pen switching mode and comprises a pressing rod, a locking member and a spring; the pressing rod is provided with an upper tooth column, the locking member is provided with a lower tooth column, and an inner wall of the installation cavity is provided with a guide groove; the pressing rod is movably installed in the installation cavity and extends out to form a pressing head; and wherein the pressing rod drives the long rod through the locking member to switch states.

9. The flow-adjusting valve spool with a button according to claim 8, wherein the flow control member is a sleeve sleeved and rotatably installed on the valve spool body and is coaxial with the pressing rod; and wherein the installation position adjustment structure is arranged between the sleeve and the pressing rod.

10. The flow-adjusting valve spool with a button according to claim 9, wherein the installation position adjustment structure comprises an annular inclined surface provided on an inner wall of the sleeve and a pushing block provided on the periphery of the pressing rod; and wherein the sleeve is rotated and the annular inclined surface drives the pressing rod to move in an axial direction by pressing down or releasing the pushing block, and an end of the blocking section of the long rod is close to or away from the pressure relief hole.

11. The flow-adjusting valve spool with a button according to claim 1, wherein a water inlet of the water inlet channel is located on the periphery of the valve spool body and provided with a filter screen; and wherein the water outlet of the water outlet channel is located at the bottom end of the valve spool body.

* * * * *